United States Patent
Otsuki et al.

(10) Patent No.: US 12,282,887 B2
(45) Date of Patent: Apr. 22, 2025

(54) LOGISTICS SYSTEM, LOGISTICS ROBOT, AND LOGISTICS ROBOT CONTROL METHOD

(71) Applicant: TOYOTA JIDOSHA KABUSHIKI KAISHA, Toyota (JP)

(72) Inventors: Nobuhisa Otsuki, Toyota (JP); Haeyeon Lee, Chuo-ku (JP); Kunihiro Iwamoto, Nagakute (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 17/742,942

(22) Filed: May 12, 2022

(65) Prior Publication Data
US 2022/0366365 A1 Nov. 17, 2022

(30) Foreign Application Priority Data
May 14, 2021 (JP) .................................. 2021-082630

(51) Int. Cl.
G06Q 10/0832 (2023.01)
G05D 1/00 (2006.01)

(52) U.S. Cl.
CPC ....... G06Q 10/0832 (2013.01); G05D 1/0088 (2013.01); G05D 1/0217 (2013.01)

(58) Field of Classification Search
CPC ............. G06Q 10/0832; G06Q 10/083; G06Q 10/08355
See application file for complete search history.

(56) References Cited

U.S. PATENT DOCUMENTS

| | | | |
|---|---|---|---|
| 10,861,265 B1* | 12/2020 | Merkley | G06V 20/52 |
| 11,615,370 B1* | 3/2023 | Li | G07C 5/008 |
| | | | 705/338 |
| 2017/0262790 A1* | 9/2017 | Khasis | G08G 1/012 |
| 2018/0232839 A1* | 8/2018 | Heinla | G05D 1/0282 |
| 2021/0035064 A1* | 2/2021 | Nishikawa | B65G 61/00 |
| 2021/0102817 A1* | 4/2021 | Kim | G01C 21/3407 |
| 2023/0196271 A1* | 6/2023 | Gao | G06Q 10/047 |
| | | | 705/338 |

FOREIGN PATENT DOCUMENTS

JP 6164599 B1 7/2017

OTHER PUBLICATIONS

El-Sheimy et al., "Indoor navigation: state of the art and future trends," Springer Open, May 3, 2021, Retrieved from https://doi.org/10.1186/s43020-021-00041-3 (Year: 2021).*

* cited by examiner

*Primary Examiner* — Rupangini Singh
*Assistant Examiner* — Bryan J Kirk
(74) *Attorney, Agent, or Firm* — Sughrue Mion, PLLC

(57) ABSTRACT

A logistics system provides a logistics service utilizing a logistics robot that delivers packages by autonomous traveling. The logistics system includes one or more processors. When delivery destinations of the packages are dispersedly located on a plurality of floors of a building, the one or more processors execute a priority determination process that determines priority among the plurality of floors. Then, the one or more processors execute a logistics robot control process that controls the logistics robot so as to deliver the packages to the plurality of floors in an order of the priority.

8 Claims, 11 Drawing Sheets

LOGISTICS SYSTEM, LOGISTICS ROBOT, AND LOGISTICS ROBOT CONTROL METHOD

CROSS-REFERENCE TO RELATED APPLICATION

This application claims priority to Japanese Patent Application No. 2021-082630 filed on May 14, 2021, the entire contents of which are incorporated by reference herein.

BACKGROUND

Technical Field

The present disclosure relates to a logistics service utilizing a logistics robot that delivers a package by autonomous traveling.

Background Art

Patent Literature 1 discloses a home delivery system utilizing a moving body that performs automated driving. The home delivery system identifies a home delivery locker corresponding to a delivery destination from among a plurality of home delivery lockers. The moving body performs the automated driving to deliver a package to the identified home delivery locker.

LIST OF RELATED ART

Patent Literature 1: Japanese Patent No. 6164599

SUMMARY

A logistics service utilizing a logistics robot that delivers packages by autonomous traveling is considered. A case where delivery destinations of the packages are dispersedly located on a plurality of floors of a same building is conceivable. Patent Literature 1 does not consider a delivery method in such the case. Delivering the packages to the plurality of floors without planning is not necessarily the best way, and there is room for improvement.

An object of the present disclosure is to provide a technique that can deliver packages with planning when delivery destinations of the packages are dispersedly located on a plurality of floors of a building.

A first aspect is directed to a logistics system providing a logistics service utilizing a logistics robot that delivers packages by autonomous traveling.

The logistics system includes one or more processors.

The one or more processors are configured to execute:
a priority determination process that, when delivery destinations of the packages are dispersedly located on a plurality of floors of a building, determines priority among the plurality of floors; and
a logistics robot control process that controls the logistics robot so as to deliver the packages to the plurality of floors in an order of the priority.

A second aspect is directed to a logistics robot that delivers packages by autonomous traveling.

The logistics robot includes one or more processors.

The one or more processors are configured to execute:
a priority determination process that, when delivery destinations of the packages are dispersedly located on a plurality of floors of a building, determines priority among the plurality of floors; and
a logistics robot control process that controls the logistics robot so as to deliver the packages to the plurality of floors in an order of the priority.

A third aspect is directed to a logistics robot control method for controlling a logistics robot that delivers packages by autonomous traveling.

The logistics robot control method includes:
a priority determination process that, when delivery destinations of the packages are dispersedly located on a plurality of floors of a building, determines priority among the plurality of floors; and
a logistics robot control process that controls the logistics robot so as to deliver the packages to the plurality of floors in an order of the priority.

According to the present disclosure, when the delivery destinations of the packages are dispersedly located on the plurality of floors of the building, the priority among the plurality of floors is determined. The packages are delivered not without planning but with planning in accordance with the determined priority. Thus, efficient package delivery is achieved.

EMBODIMENTS

Embodiments of the present disclosure will be described with reference to the accompanying drawings.

1. Logistics System

Figure 1:
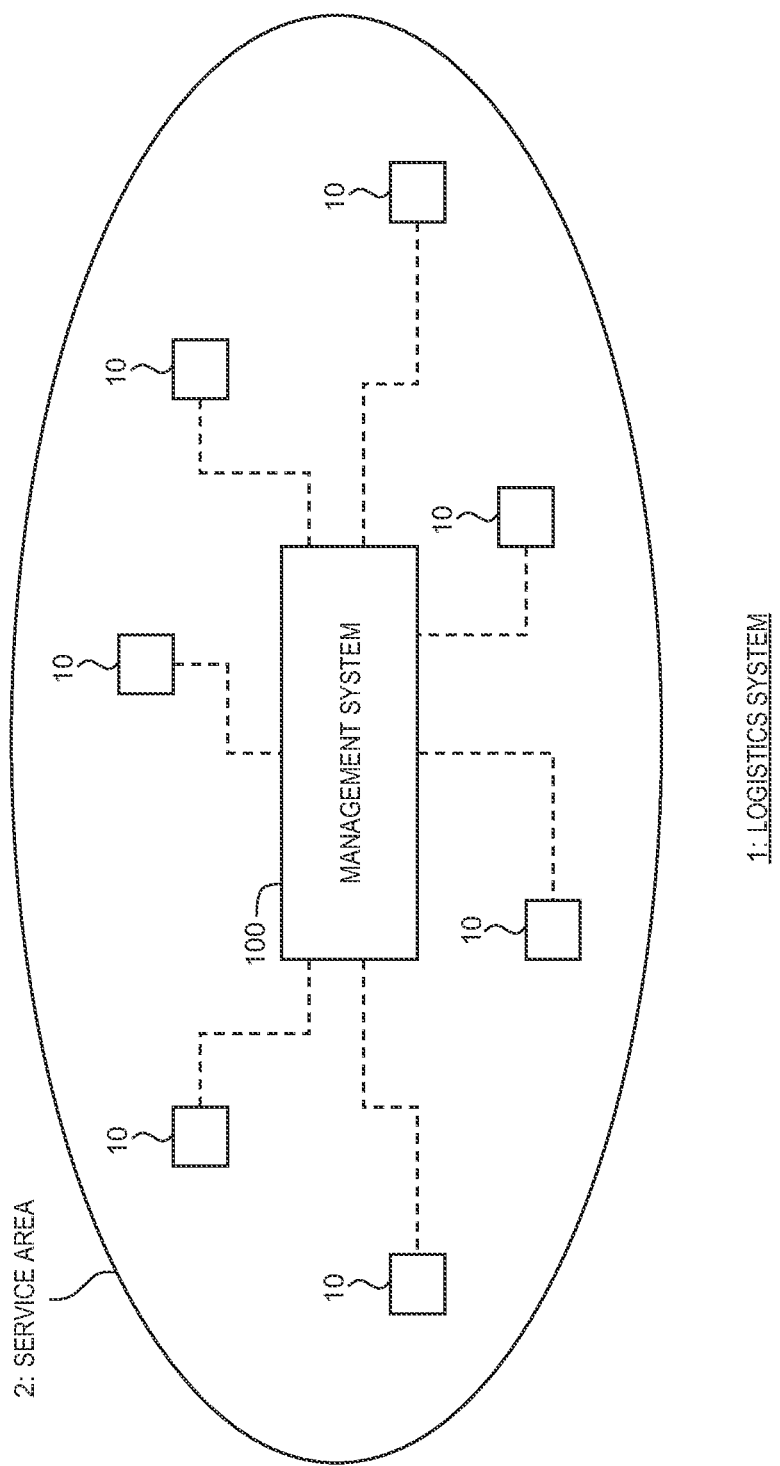
FIG. 1 is a conceptual diagram for explaining a logistics system according to an embodiment of the present disclosure.
Figure 2:
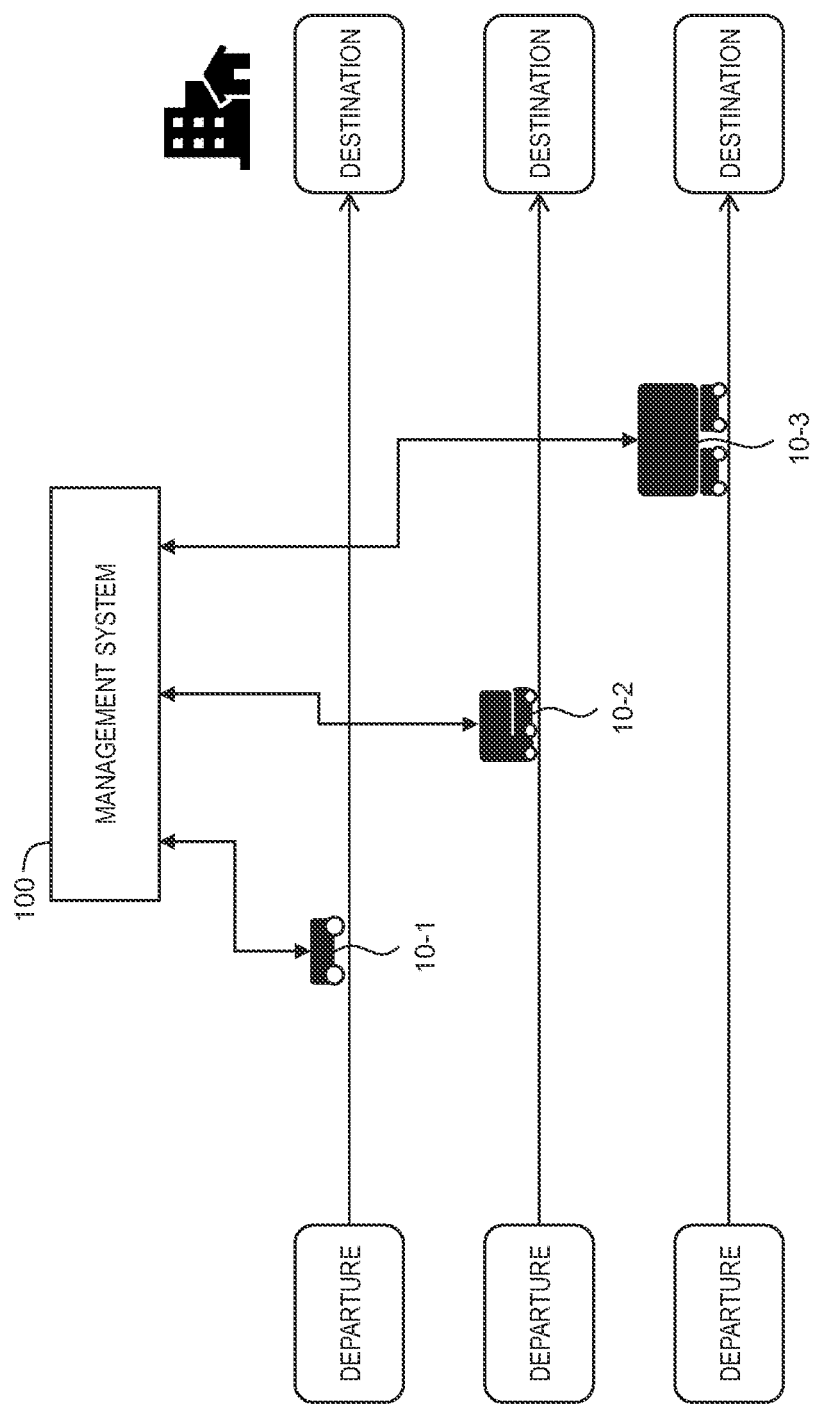
FIG. 2 is a conceptual diagram for explaining a logistics system according to an embodiment of the present disclosure.

FIGS. 1 and 2 are conceptual diagrams for explaining a logistics system 1 according to the present embodiment. The logistics system 1 provides a logistics service. A service area 2 is a predetermined area in which the logistics service is provided. For example, the service area 2 is a city such as a smart city. The logistics system 1 includes a plurality of logistics robots 10 and a management system 100.

The logistics robot 10 is a robot mainly used for delivering a package. The logistics robot 10 is configured to be capable of autonomous traveling and travels autonomously from a point of departure to a destination. For example, the point of departure is a collection point of packages (e.g. a logistics center), and the destination is a delivery destination of a package (e.g. a user's residence). As another example, the point of departure is a delivery destination of a package, and the destination is a delivery destination of another package. As yet another example, the point of departure is a delivery destination of a final package, and the destination is the collection point of packages.

A type of the logistics robot 10 is not limited to one. Multiple types of logistics robots 10 may be utilized. For example, as shown in FIG. 2, a small logistics robot 10-1, a medium logistics robot 10-2, a large logistics robot 10-3, and the like may be utilized.

The management system 100 manages the logistics service, manages and controls the logistics robots 10. The management system 100 is, for example, a management server. The management system 100 may be a distributed processing system.

The management system 100 is capable of communicating with each logistics robot 10 and collects information about a position and a status from each logistics robot 10. Moreover, the management system 100 receives a delivery request from a user of the logistics service. In response to the delivery request, the management system 100 assigns a logistics robot 10 that performs delivery, and determines a delivery route along which the logistics robot 10 delivers a package. Then, the management system 100 notifies the logistics robot 10 of the determined delivery route, and instructs the logistics robot 10 to deliver the package along the delivery route. The logistics robot 10 autonomously travels along the notified delivery route to deliver the package.

2. Package Delivery to Plurality of Floors

Figure 3:
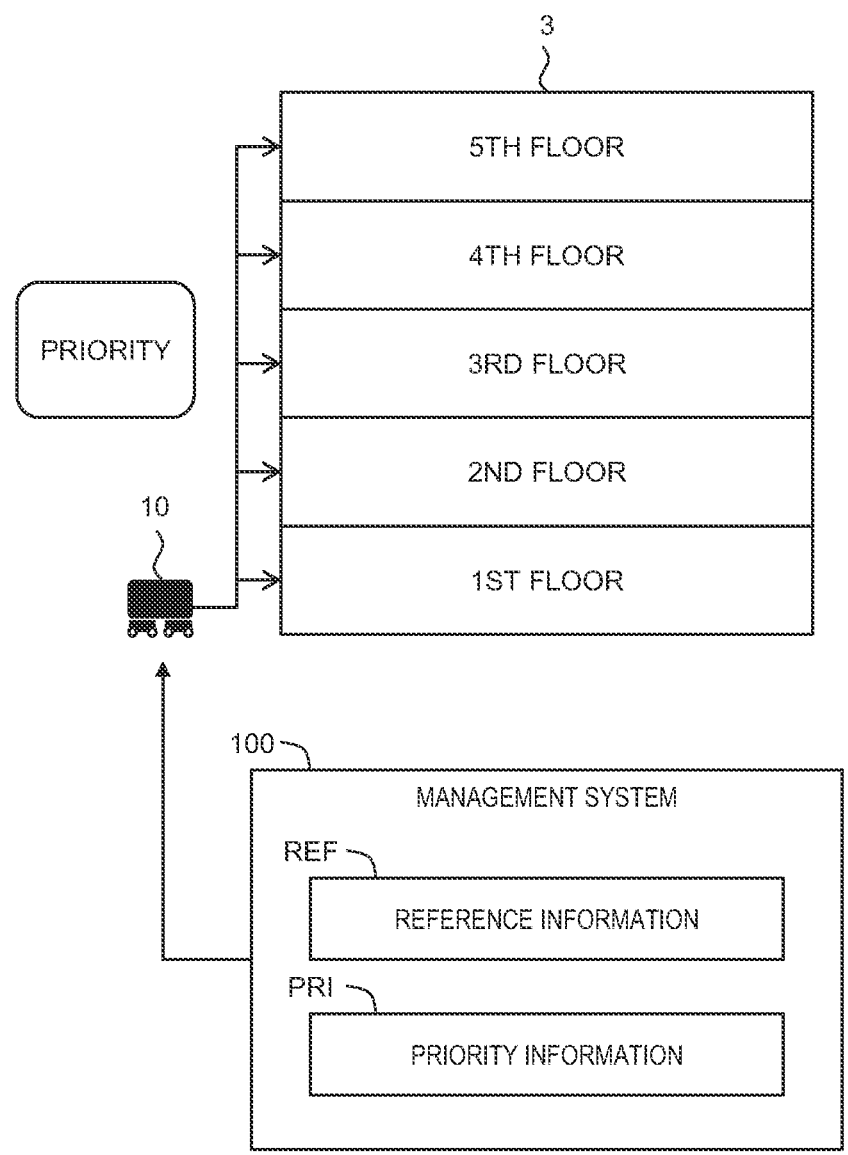
FIG. 3 is a conceptual diagram for explaining delivery of packages to a plurality of floors according to an embodiment of the present disclosure.

FIG. 3 is a conceptual diagram for explaining a case where delivery destinations of packages are dispersedly located on a plurality of floors of a same building 3. Examples of the building 3 include an apartment house, an office building, and the like.

According to the present embodiment, when delivery destinations of packages are dispersedly located on a plurality of floors of the building 3, priority among the plurality of floors is determined. An entity that determines the priority may be the management system 100 or may be the logistics robot 10. Then, the logistics robot 10 delivers the packages to the plurality of floors of the building 3 in an order of the determined priority.

For example, the management system 100 determines the priority. "Reference information REF" which will be described in detail later is used for determining the priority. The management system 100 acquires the reference information REF and determines the priority among the plurality of floors based on the reference information REF. Priority information PRI indicates the determined priority. The management system 100 provides the priority information PRI to the logistics robot 10 and instructs the logistics robot 10 to deliver the packages to the plurality of floors in the order of the priority. Issuing the instruction to the logistics robot 10 is included in a concept of controlling the logistics robot 10. In accordance the priority indicated by the priority information PRI, the logistics robot 10 moves on the plurality of floors of the building 3 in order and delivers the packages in order.

As another example, the logistics robot 10 determines the priority. The logistics robot 10 acquires the reference information REF by itself, or acquires the reference information REF from the management system 100. The logistics robot 10 determines the priority among the plurality of floors based on the reference information REF to generate the priority information PRI. Then, in accordance the priority indicated by the priority information PRI, the logistics robot 10 moves on the plurality of floors of the building 3 in order and delivers the packages in order.

Figure 4:
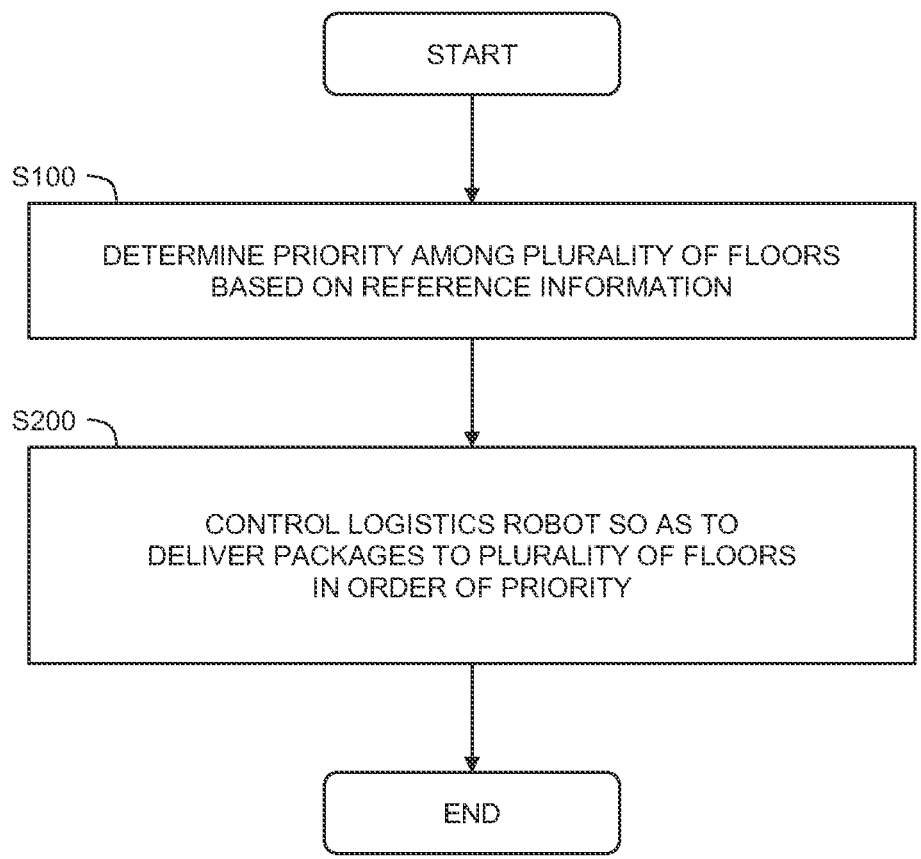
FIG. 4 is a flow chart showing in a summarized manner processing by a logistics system according to an embodiment of the present disclosure.

FIG. 4 is a flow chart showing in a summarized manner the processing by the logistics system 1 according to the present embodiment. In particular, FIG. 4 shows the processing related to the delivery of the packages to the plurality of floors of the building 3.

In Step S100, the logistics system 1 executes a "priority determination process." More specifically, the logistics system 1 (i.e., the management system 100 or the logistics robot 10) determines the priority among the plurality of floors based on the reference information REF to acquire the priority information PRI.

In Step S200, the logistics system 1 executes a "logistics robot control process." More specifically, the logistics system 1 (i.e., the management system 100 or the logistics robot 10) controls the logistics robot 10 so as to deliver the packages to the plurality of floors in the order of the priority indicated by the priority information PRI. It should be noted that issuing an instruction from the management system 100 to the logistics robot 10 also is included in the concept of controlling the logistics robot 10.

As described above, according to the present disclosure, when the delivery destinations of the packages are dispersedly located on the plurality of floors of the building 3, the priority among the plurality of floors is determined. The packages are delivered not without planning but with planning in accordance with the determined priority. Thus, efficient package delivery is achieved.

Hereinafter, various examples of the "priority determination process" according to the present embodiment will be described.

2-1. First Example

Figure 5:
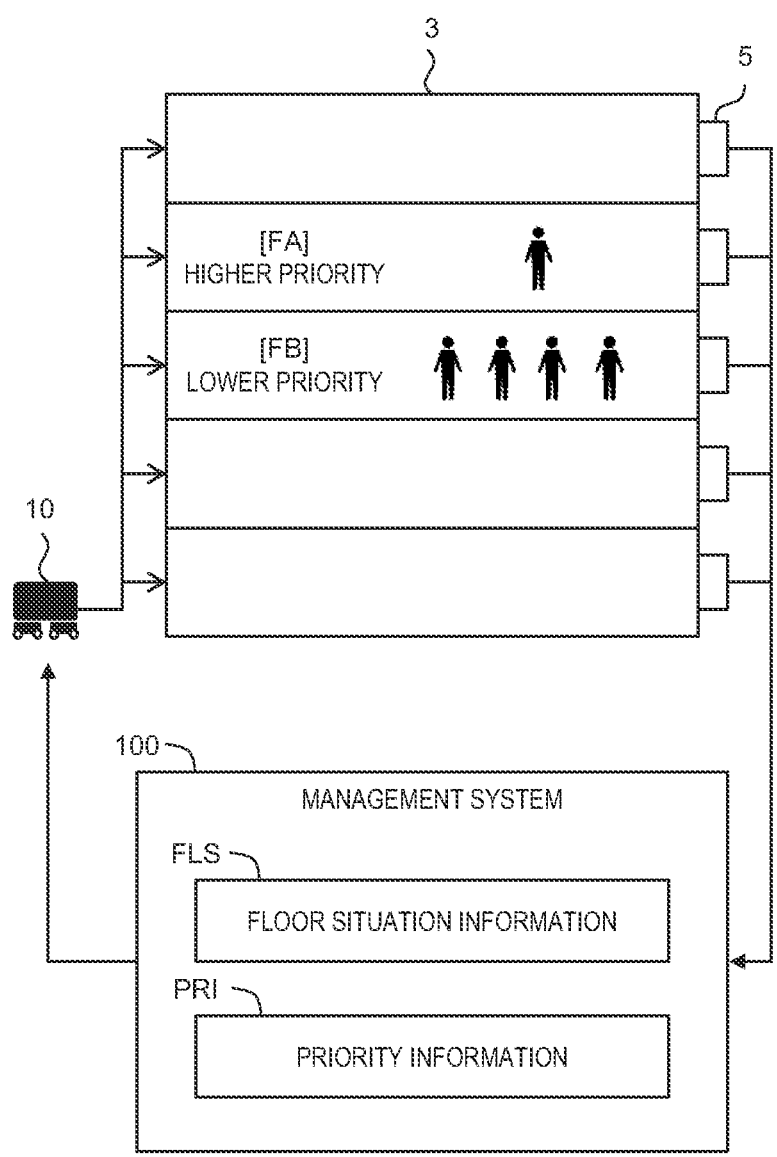
FIG. 5 is a conceptual diagram for explaining a first example of a priority determination process according to an embodiment of the present disclosure.

FIG. 5 is a conceptual diagram for explaining a first example of the priority determination process. A sensor 5 is installed on each floor of the building 3. The sensor 5 recognizes a situation of a passage of each floor. The passage here is utilized not only by the logistics robot 10 but also by people and other robots. For example, the sensor 5 include a camera that captures the situation of the passage of each floor to acquire image information. Floor situation information FLS is information indicating a result of recognition by the sensor 5, that is, the situation of the passage of each floor (e.g., the image information). The sensor 5 is capable of communicating with the management system 100 and transmits the floor situation information FLS to the management system 100.

The management system 100 acquires (collects) the floor situation information FLS from each sensor 5. In the first example, the floor situation information FLS is used as the reference information REF and the priority determination process is performed.

More specifically, the management system 100 calculates a congestion degree of the passage of each floor based on the floor situation information FLS of each floor. Here, the congestion degree indicates how crowded the passage is with moving bodies. Examples of the moving body include a person, a robot (including other logistics robots 10), and the like. The congestion degree may be a total number of moving bodies present in the passage, or may be a density of the moving bodies. For example, when the floor situation information FLS includes the image information indicating the situation of the passage, the congestion degree can be calculated by analyzing the image information to identify the moving bodies. Moreover, when it is recognized that a door facing the passage is opened, it is predicted that the moving bodies will increase or decrease, and thus the congestion degree may be corrected accordingly. That is, the congestion degree may be a current value or may be a predicted value in the near future.

The management system 100 determines the priority of each floor according to the congestion degree. More specifically, the management system 100 sets the priority lower as the congestion degree becomes higher, and sets the priority higher as the congestion degree becomes lower. As an example, two floors FA and FB shown in FIG. 5 are compared. The congestion degree of the floor FA is lower than the congestion degree of the floor FB. Therefore, the management system 100 sets the priority of the floor FA to be higher than the priority of the floor FB.

The same applies to the case where the logistics robot 10 performs the priority determination process. The management system 100 communicates with the logistics robot 10 and transmits the floor situation information FLS to the logistics robot 10. The logistics robot 10 calculates the congestion degree of the passage of each floor based on the floor situation information FLS of each floor. Then, the logistics robot 10 determines the priority of each floor according to the congestion degree.

As described above, according to the first example, the priority of the floor with a lower congestion degree becomes higher. Therefore, the logistics robot 10 delivers the package first from the floor with the lower congestion degree. The logistics robot 10 is able to smoothly move through the uncrowded passage. Moreover, in the uncrowded passage, a risk of contact between the logistics robot 10 and another moving body is greatly reduced. Furthermore, congestion of another floor with a high congestion degree is expected to be eliminated while the logistics robot 10 is delivering the package to the floor with the lower congestion degree. As described above, a delivery efficiency when delivering the packages to the plurality of floors of the building 3 is improved, and safety is improved as well.

2-2. Second Example

Figure 6:
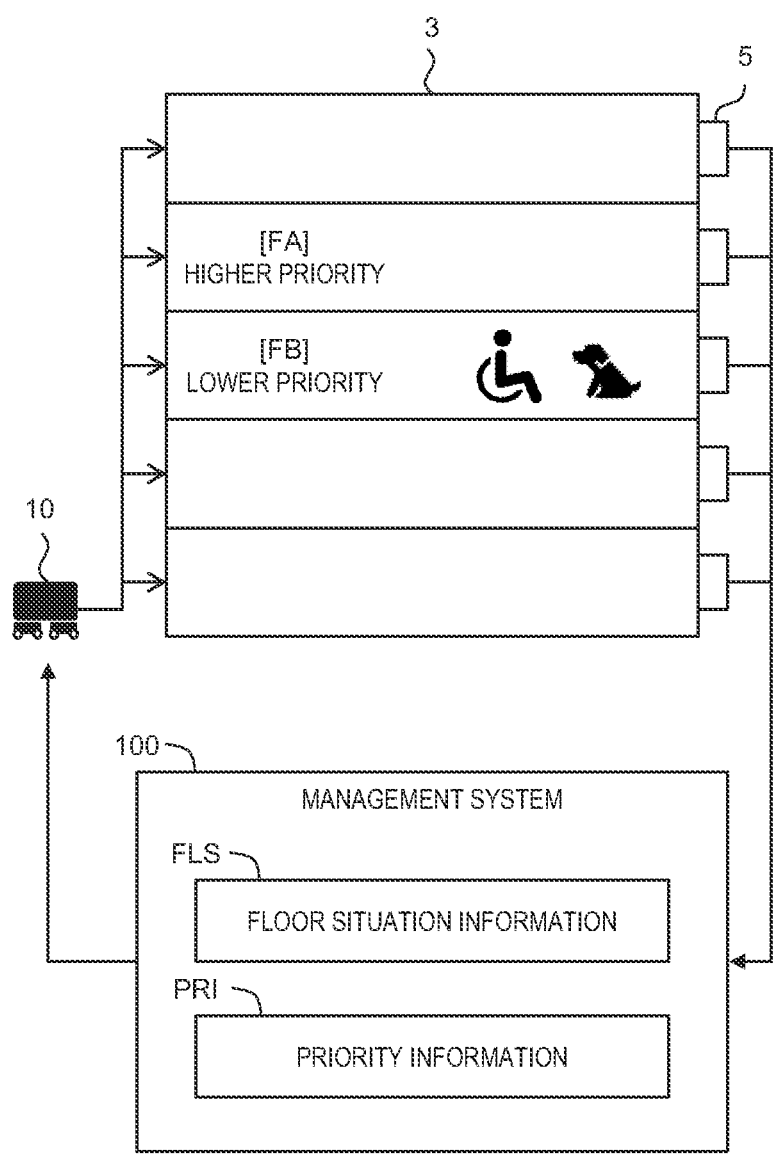
FIG. 6 is a conceptual diagram for explaining a second example of a priority determination process according to an embodiment of the present disclosure.

FIG. 6 is a conceptual diagram for explaining a second example of the priority determination process. Also in the second example, the floor situation information FLS is used as the reference information REF and the priority determination process is performed. A description overlapping with the first example will be omitted as appropriate.

In the second example, a child, a disabled person, a pet, and the like are taken into consideration. It is considered that an adult noticing existence of the logistics robot 10 will try to avoid a contact with the logistics robot 10. However, a child has a lower ability of recognizing surroundings as compared with adults and thus may be difficult to notice the existence of the logistics robot 10. Moreover, avoiding the logistics robot 10 forces a disable person to bear the burden. A pet may not recognize the logistics robot 10 as a target to avoid.

In view of the above, the management system 100 determines the priority of each floor in consideration of the number of "specific targets" such as a child, a disabled person, a pet, and the like. More specifically, the management system 100 identifies the specific target existing on each floor based on the floor situation information FLS. For example, when the floor situation information FLS includes the image information indicating the situation of the passage, the specific target can be identified by analyzing the image information. Then, the management system 100 sets the priority lower as the number of specific targets increases, and sets the priority higher as the number of specific targets decreases. As an example, two floors FA and FB shown in FIG. 6 are compared. More specific targets exist on the floor FB than on the floor FA. Therefore, the management system 100 sets the priority of the floor FA to be higher than the priority of the floor FB.

The same applies to the case where the logistics robot 10 performs the priority determination process. The management system 100 communicates with the logistics robot 10 and transmits the floor situation information FLS to the logistics robot 10. The logistics robot 10 identifies the specific target based on the floor situation information FLS of each floor. Then, the logistics robot 10 determines the priority of each floor in consideration of the amount of specific target.

As described above, according to the second example, the priority of the floor with fewer specific target becomes higher. Therefore, the logistics robot 10 delivers the package first from the floor with fewer specific target. The logistics robot 10 is able to smoothly move through the passage with fewer specific target. Moreover, in the passage with fewer specific target, a risk of contact between the logistics robot 10 and the specific target is greatly reduced. Furthermore, the specific target on another floor with more specific targets is expected to move out while the logistics robot 10 is delivering the package to the floor with fewer specific target. As described above, a delivery efficiency when delivering the packages to the plurality of floors of the building 3 is improved, and safety is improved as well.

2-3. Third Example

Figure 7:
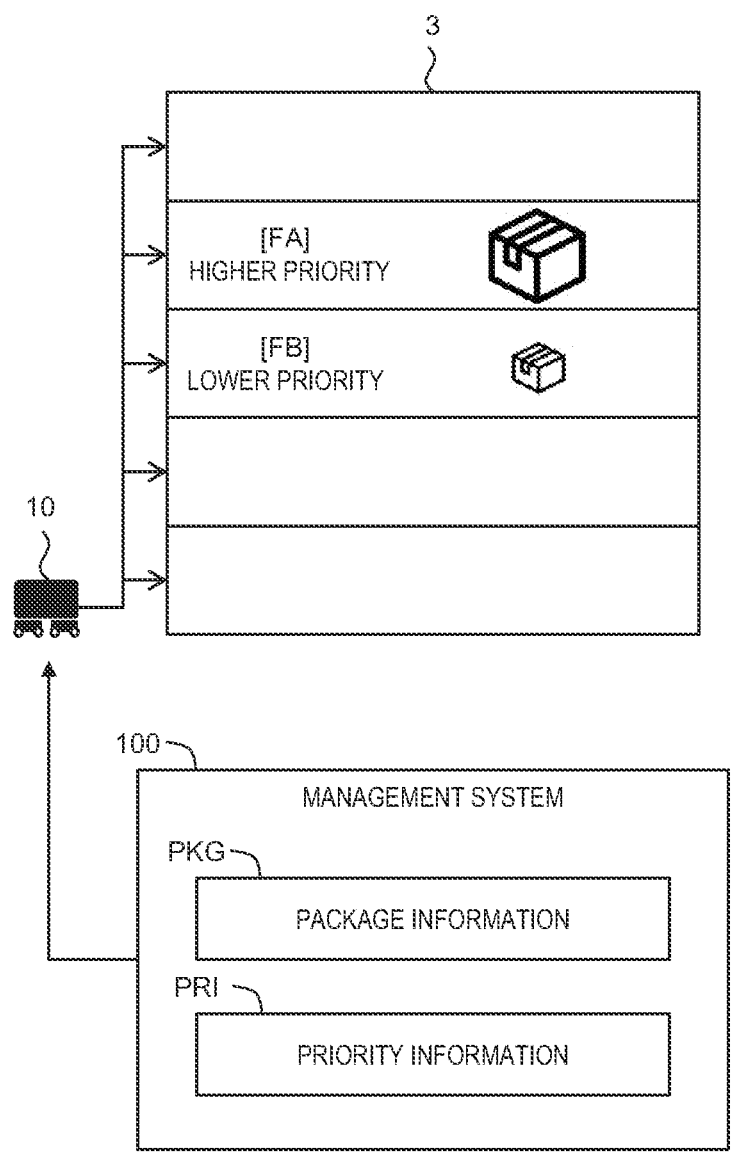
FIG. 7 is a conceptual diagram for explaining a third example of a priority determination process according to an embodiment of the present disclosure.

FIG. 7 is a conceptual diagram for explaining a third example of the priority determination process. In the third example, a physical quantity of the package to be delivered to each floor is taken into consideration. The physical quantity of the package includes at least one of a weight and a volume. Package information PKG indicates at least one of the weight and the volume of each package. The package information PKG is used as the reference information REF and the priority determination process is performed.

More specifically, when assigning a package delivery to a logistics robot 10, the management system 100 acquires the package information PKG regarding the packages that the assigned logistics robot 10 is responsible for. The package information PKG indicates a correspondence relationship between the delivery destination and the physical quantity (weight, volume) for each package. Based on the package information PKG, the management system 100 calculates a total weight or a total volume of one or more packages to be delivered to each floor of the building 3. Then, the management system 100 determines the priority of each floor according to the total weight or the total volume calculated.

For example, the management system 100 determines the priority of each floor according to the total weight of one or more packages to be delivered to each floor. More specifically, the management system 100 sets the priority higher as the total weight becomes heavier, and sets the priority lower as the total weight becomes lighter. As an example, two floors FA and FB shown in FIG. 7 are compared. The total weight of the package to be delivered to the floor FA is greater than the total weight of the package to be delivered to the floor FB. Therefore, the management system 100 sets the priority of the floor FA to be higher than the priority of the floor FB.

As another example, the management system 100 determines the priority of each floor according to the total volume of one or more packages to be delivered to each floor. More specifically, the management system 100 sets the priority higher as the total volume becomes larger, and sets the priority lower as the total volume becomes smaller. As an example, two floors FA and FB shown in FIG. 7 are compared. The total volume of the package to be delivered to the floor FA is larger than the total volume of the package to be delivered to the floor FB. Therefore, the management system 100 sets the priority of the floor FA to be higher than the priority of the floor FB.

The same applies to the case where the logistics robot 10 performs the priority determination process. The logistics robot 10 assigned the package delivery acquires the package information PKG from the management system 100, and performs the package delivery in accordance with the package information PKG. Based on the package information PKG, the logistics robot 10 calculates the total weight or the total volume of one or more packages to be delivered to each floor of the building 3. Then, the logistics robot 10 determines the priority of each floor according to the total weight or the total volume calculated.

As described above, according to the third example, the priority of the floor becomes higher as the total weight or the total volume of one or packages to be delivered thereto becomes greater. For example, when the priority of the floor with the heavier total weight is higher, the logistics robot 10 first unloads the heavy package. As the heavy package is unloaded, the logistics robot 10 becomes lighter and thus an energy efficiency is improved. As another example, when the priority of the floor with the larger total volume is higher, the logistics robot 10 first unloads the large package. When the large package is unloaded, a large free space is generated. By utilizing the large free space, it is possible to more efficiently carry out pick-up of packages concurrently with the delivery of packages.

2-4. Fourth Example

A combination of two or more examples described above also is possible. That is, it is also possible to perform the priority determination process by considering two or more of a plurality of parameters such as the congestion degree, the number of specific targets, the total weight, and the total volume. For example, a score is calculated by combining each parameter. Then, the priority is set to be higher as the score becomes higher.

3. Logistics Robot 3-1. Configuration Example

Figure 8:
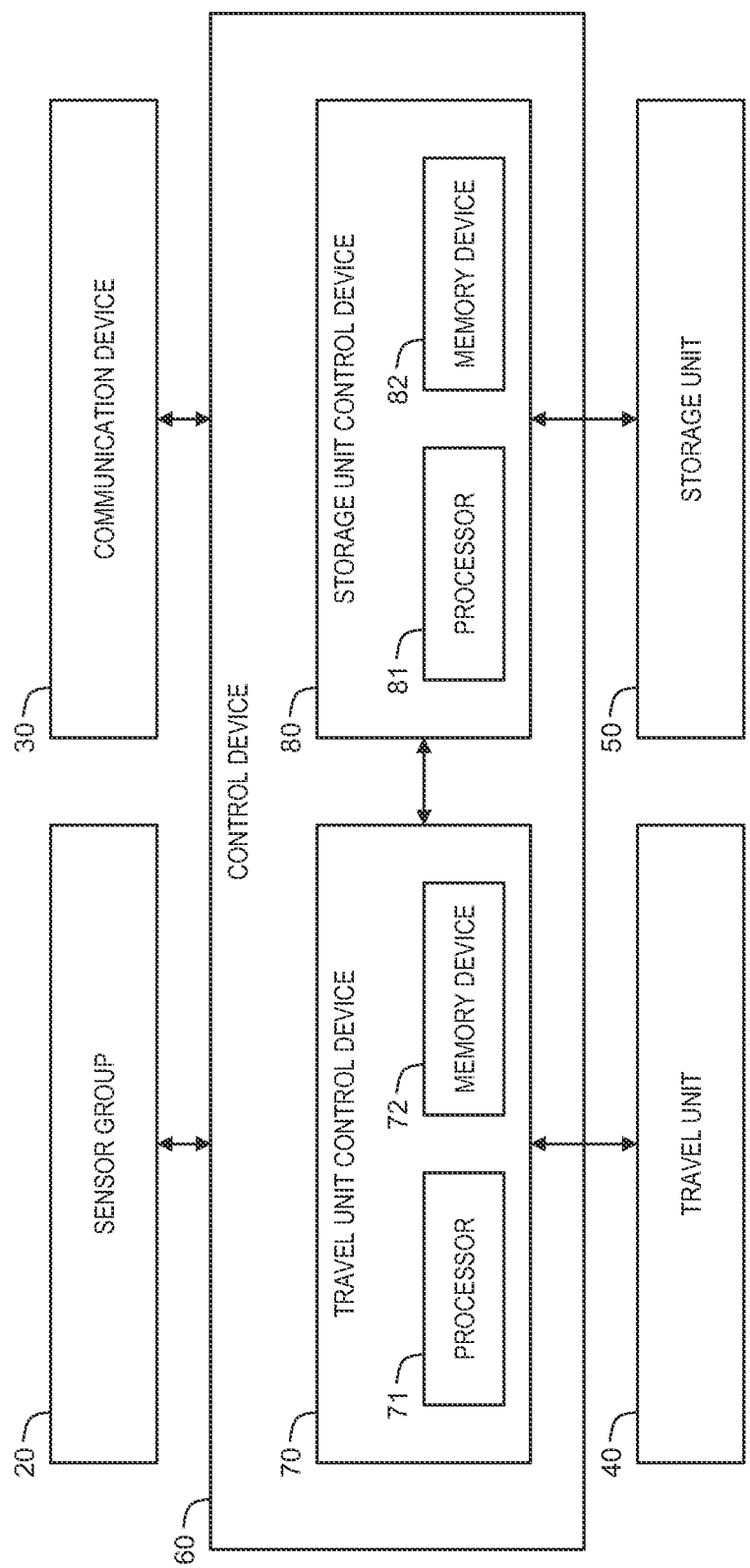
FIG. 8 is a block diagram showing a configuration example of a logistics robot according to an embodiment of the present disclosure.

FIG. 8 is a block diagram showing a configuration example of the logistics robot 10 according to the present embodiment. The logistics robot 10 includes a sensor group 20, a communication device 30, a travel unit 40, a storage unit 50, and a control device 60.

The sensor group 20 includes a position sensor, a state sensor, a recognition sensor, and the like. The position sensor acquires a position and an orientation of the logistics robot 10. Examples of the position sensor include a GNSS (Global Navigation Satellite System) receiver. The state sensor detects a state of the logistics robot 10. Examples of the state of the logistics robot 10 include a wheel speed, a speed, an acceleration (a longitudinal acceleration, a lateral acceleration, and the like), an angular velocity (a yaw rate, and the like), a loading weight, a remaining battery level, a failure status, and the like. The recognition sensor recognizes a situation around the logistics robot 10. Examples of the recognition sensor include a camera, a LIDAR (LIght Detection And Ranging), a radar, a sonar, and the like.

The communication device 30 communicates with the outside of the logistics robot 10. For example, the communication device 30 communicates with the management system 100 through a wireless communication network such as 4G, 5G, and the like. The communication device 30 may be connected to a wireless LAN. The communication device 30 may perform a near field communication with another logistics robot 10 nearby. Examples of the near field communication system include infrared communication, Bluetooth (registered trademark), and the like.

The travel unit 40 accelerates, decelerates, and turns the logistics robot 10. For example, the travel unit 40 includes wheels, electric motors for driving the wheels, driving circuits for driving the electric motors, a battery for supplying power, and the like. Acceleration and deceleration of the logistics robot 10 are performed by controlling the electric motor. Braking may be performed by the use of regenerative braking by control of the electric motor. Moreover, at least one of the wheels may be provided with a mechanical brake. Turning of the logistics robot 10 can be realized by controlling a difference in rotation speed between the left and right wheels (motors). As another example, a steering mechanism for steering the wheel may be provided. A certain wheel may be an omni wheel.

The storage unit 50 stores a package. For example, the storage unit 50 includes a storage box, an actuator for automatically opening and closing a lid of the storage box, an actuator for changing a position and an orientation of the storage box, an arm for taking out the package from the storage box, and the like.

The control device (controller) 60 controls the logistics robot 10. For example, the control device 60 includes a travel unit control device 70 that controls the travel unit 40 and a storage unit control device 80 that controls the storage unit 50. The travel unit control device 70 and the storage unit control device 80 are communicatively connected with each other and perform processing in cooperation with each other.

The travel unit control device 70 includes one or more processors 71 (hereinafter, simply referred to as a "processor 71") that execute a variety of processing and one or more memory devices 72 (hereinafter, simply referred to as a "memory device 72") that store a variety of information. For example, the processor 71 includes a CPU (Central Processing Unit). Examples of the memory device 72 include a volatile memory, a non-volatile memory, an HDD (Hard Disk Drive), an SSD (Solid State Drive), and the like. The function of the travel unit control device 70 is implemented by the processor 71 executing a computer program. The computer program may be recorded on a non-transitory computer-readable recording medium.

The storage unit control device 80 includes one or more processors 81 (hereinafter, simply referred to as a "processor 81") that execute a variety of processing and one or more memory devices 82 (hereinafter, simply referred to as a "memory device 82") that store a variety of information. For example, the processor 81 includes a CPU. Examples of the memory device 82 include a volatile memory, a non-volatile memory, an HDD, an SSD, and the like. The function of the storage unit control device 80 is implemented by the processor 81 executing a computer program. The computer program may be recorded on a non-transitory computer-readable recording medium.

3-2. Example of Variety of Information

Figure 9:
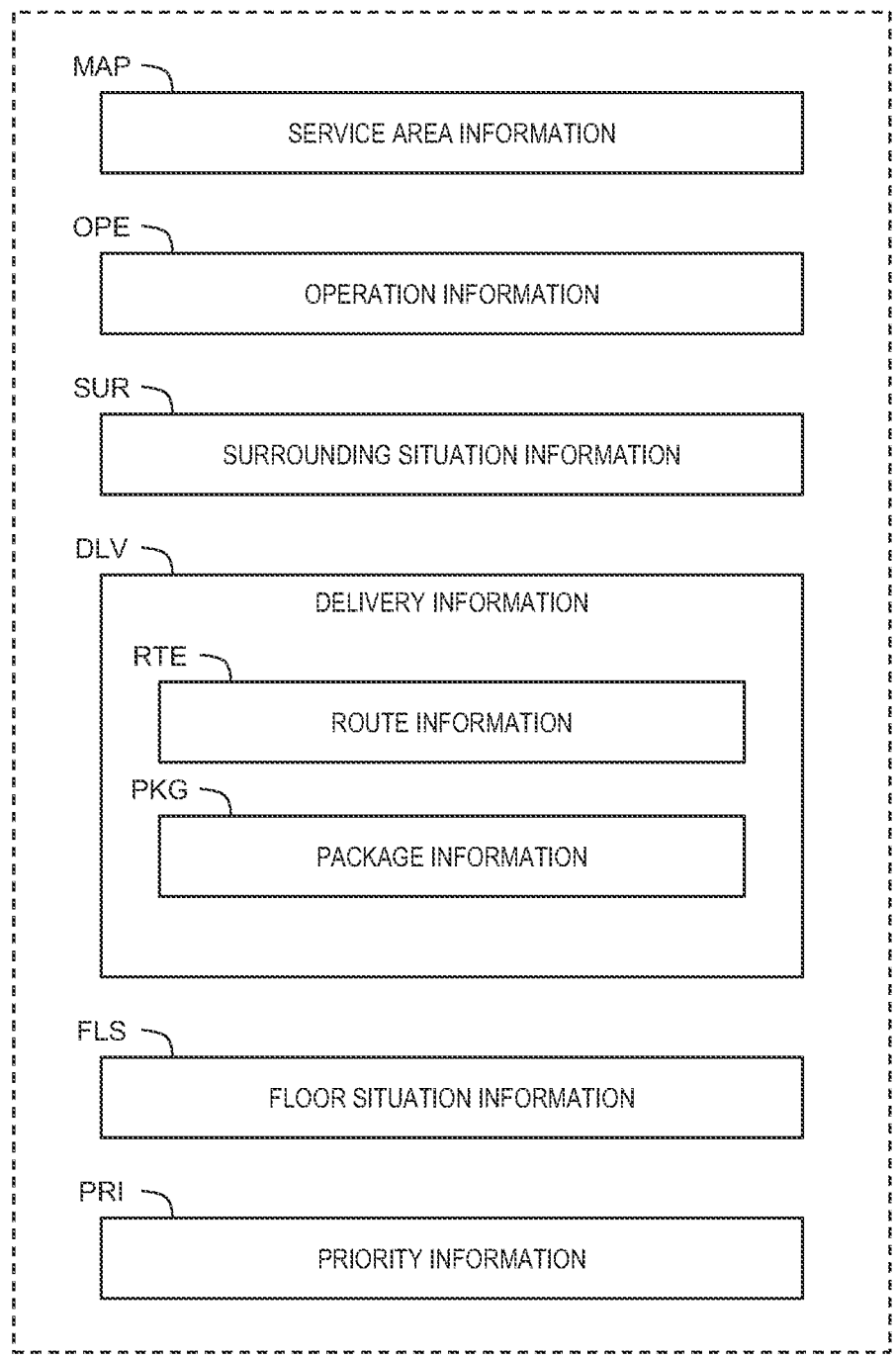
FIG. 9 is a block diagram showing an example of a variety of information in a logistics robot according to an embodiment of the present disclosure.

FIG. 9 is a block diagram showing an example of a variety of information in the logistics robot 10. The variety of information is stored in the memory device 72 and the memory device 82.

Service area information MAP indicates a configuration of the service area 2 (see FIG. 1) in which the logistics service is provided. For example, the service area information MAP includes a three-dimensional road map, a building layout, a floor configuration in a building, a room layout of each floor, an elevator layout of a building, and the like. The service area information MAP is provided, for example, from the management system 100. The control device 60 acquires the service area information MAP from the management system 100 via the communication device 30.

Operation information OPE indicates the position and the state of the logistics robot 10. The position of the logistics robot 10 is acquired by the position sensor of the sensor group 20. The control device 60 may acquire high accuracy position information by a well-known localization process. The state of the logistics robot 10 is detected by the state sensor of the sensor group 20. Examples of the state of the logistics robot 10 include a wheel speed, a speed, an acceleration (a longitudinal acceleration, a lateral acceleration, and the like), an angular velocity (a yaw rate, and the like), a loading weight, a remaining battery level, a failure status, and the like. The control device 60 acquires the operation information OPE from the sensor group 20.

Surrounding situation information SUR indicates a situation around the logistics robot 10. The surrounding situation information SUR is obtained from a result of recognition by the recognition sensor of the sensor group 20. For example, the surrounding situation information SUR includes an image (video) captured by the camera. The surrounding situation information SUR may include object information regarding an object around the logistics robot 10. Examples of the object around the logistics robot 10 include a pedestrian, a mobility (a vehicles, a robot), a sign, a white line, a roadside structure, a building, and the like. The object information indicates a relative position and a relative velocity of the object relative to the logistics robot 10.

Delivery information DLV is information regarding the package delivery. For example, the delivery information DLV includes route information RTE and the package information PKG. The route information RTE indicates a delivery route along which the logistics robot 10 travels. The package information PKG indicates a delivery destination of each package. As described above, the package information PKG may indicate a correspondence relationship between the delivery destination and the physical quantity (weight, volume) for each package. The delivery information DLV is generated by the management system 100. The control device 60 acquires the delivery information DLV from the management system 100 via the communication device 30.

The floor situation information FLS indicates the situation of the passage of each floor of the building 3. The floor situation information FLS is provided from the management system 100. The control device 60 acquires the floor situation information FLS from the management system 100 via the communication device 30.

The priority information PRI indicates the priority among the plurality of floors when the packages are delivered to the plurality of floors of the building 3. When the priority information PRI is generated by the management system 100, the control device 60 acquires the priority information PRI from the management system 100 via the communication device 30. Alternatively, the control device 60 of the logistics robot 10 may generate the priority information PRI.

3-3. Delivery Process

The travel unit control device 70 (the processor 71) performs travel control (acceleration control, deceleration control, and turning control) by controlling the travel unit 40. The speed, the acceleration, and the angular velocity of the logistics robot 10 are obtained from the operation information OPE. The travel unit control device 70 may perform the travel control so as to avoid a collision with an object around the logistics robot 10, based on the surrounding situation information SUR.

In particular, the travel unit control device 70 (the processor 71) performs autonomous travel control such that the logistics robot 10 travels toward a destination. More specifically, based on the service area information MAP, the operation information OPE (the position information), and the delivery information DLV (the route information RTE), the travel unit control device 70 performs the autonomous travel control such that the logistics robot 10 travels along the delivery route.

When the logistics robot 10 arrives at the delivery destination of the package, the storage unit control device 80 (the processor 81) controls the storage unit 50 for unloading the package. For example, the storage unit control device 80 automatically opens and closes the lid of the storage box, changes the position and the orientation of the storage box, takes out the package from the storage box, and so forth. Similarly, the storage unit control device 80 may control the storage unit 50 to pick up a package.

Processing when the delivery destinations of the packages are dispersedly located on the plurality of floors of the same building 3 is as follows.

For example, the travel unit control device 70 communicates with the management system 100 via the communication device 30 and requests the management system 100 to provide the priority information PRI. The request timing is preferably at or immediately before a timing when the logistics robot 10 arrives at the building 3. In response to the request, the management system 100 performs the priority determination process and generates the priority information PRI (FIG. 4, Step S100). The travel unit control device 70 acquires the priority information PRI from the management system 100 via the communication device 30. Then, the travel unit control device 70 performs the autonomous travel control such that the logistics robot 10 delivers the packages to the plurality of floors in the order of the priority indicated by the priority information PRI (FIG. 4, Step S200).

As another example, the travel unit control device 70 communicates with the management system 100 via the communication device 30 and requests the management system 100 to provide the floor situation information FLS. The request timing is preferably at or immediately before a timing when the logistics robot 10 arrives at the building 3. In response to the request, the management system 100 provides the floor situation information FLS to the logistics robot 10. The travel unit control device 70 acquires the floor situation information FLS from the management system 100 via the communication device 30. Subsequently, the travel unit control device 70 performs the priority determination process by using the floor situation information FLS as the reference information REF to generate the priority information PRI (FIG. 4, Step S100). Then, the travel unit control device 70 performs the autonomous travel control such that the logistics robot 10 delivers the packages to the plurality of floors in the order of the priority indicated by the priority information PRI (FIG. 4, Step S200).

As yet another example, the travel unit control device 70 has already acquired the package information PKG. The travel unit control device 70 performs the priority determination process by using the package information PKG as the reference information REF to generate the priority information PRI (FIG. 4, Step S100). Then, the travel unit control device 70 performs the autonomous travel control such that the logistics robot 10 delivers the packages to the plurality of floors in the order of the priority indicated by the priority information PRI (FIG. 4, Step S200).

4. Management System

4-1. Configuration Example

Figure 10:
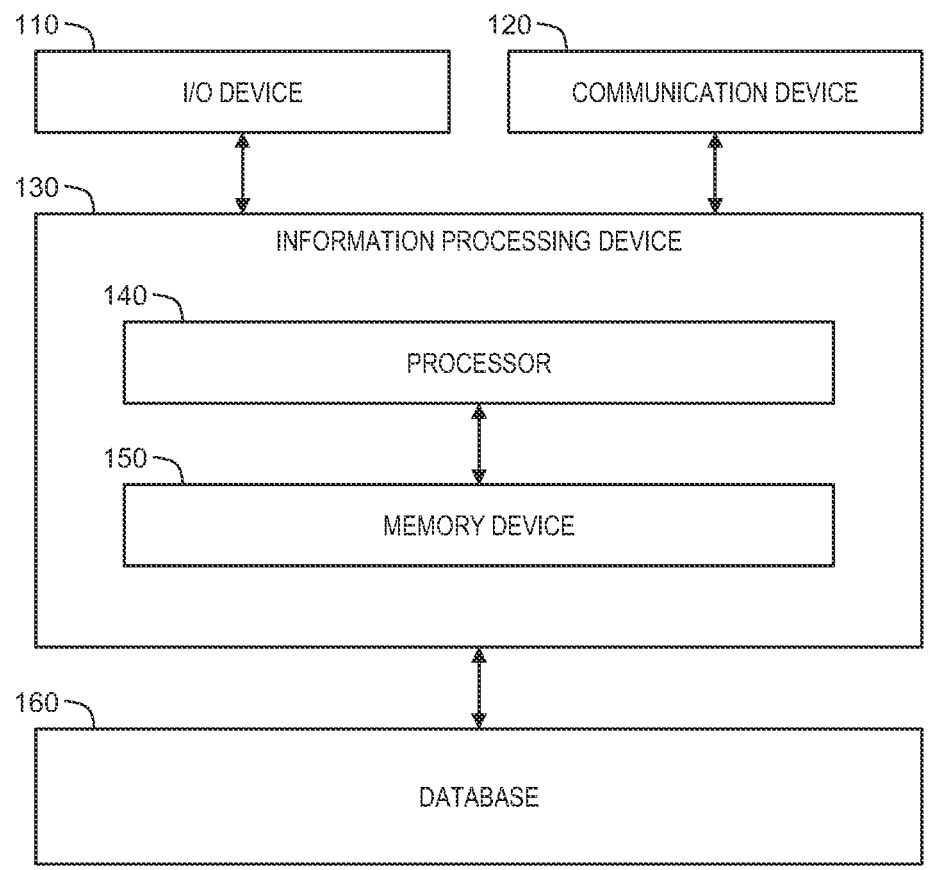
FIG. 10 is a block diagram showing a configuration example of a management system according to an embodiment of the present disclosure.

FIG. 10 is a block diagram showing a configuration example of the management system 100 according to the present embodiment. For example, the management system 100 is a management server. The management system 100 may be a distributed processing system. The management system 100 includes an input/output device 110, a communication device 120, an information processing device 130, and a database 160.

The input/output device 110 is an interface for receiving information from an operator of the management system 100 and providing the operator with information. Examples of the input device include a keyboard, a mouse, a touch panel, a switch, and the like. Examples of the output device include a display device, a speaker, and the like. The operator is able to monitor a status of the logistics service by the use of the input/output device 110.

The communication device 120 performs a communication with the outside. For example, the communication device 120 communicates with each logistics robot 10 through a wireless communication network such as 4G, 5G, and the like. The communication device 120 may be connected to a wireless LAN. In addition, the communication device 120 communicates with the sensor 5 that recognizes the situation of each floor of the building 3. Moreover, the communication device 120 may communicate with a user terminal (e.g., PC, tablet, smartphone).

The information processing device 130 includes one or more processors 140 (hereinafter, simply referred to as a "processor 140") and one or more memory devices 150 (hereinafter, simply referred to as a "memory devices 150"). The processor 140 executes a variety of information processing. For example, the processor 140 includes a CPU. The memory device 150 stores a variety of information that is necessary for the processing by the processor 140. Examples of the memory device 150 include a volatile memory, a non-volatile memory, an HDD, an SSD, and the like. The function of the information processing device 130 is implemented by the processor 140 executing a computer program. The computer program is stored in the memory device 150. The computer program may be recorded on a non-transitory computer-readable recording medium. The computer program may be provided via a network.

Moreover, the information processing device 130 can access the database 160. The database 160 is implemented by a predetermined memory device. The database 160 may be included in the memory device 150. The database 160 stores a variety of information necessary for providing the logistics service. The information processing device 130 reads necessary information from the database 160 and stores the information in the memory device 150.

4-2. Example of Variety of Information

Figure 11:
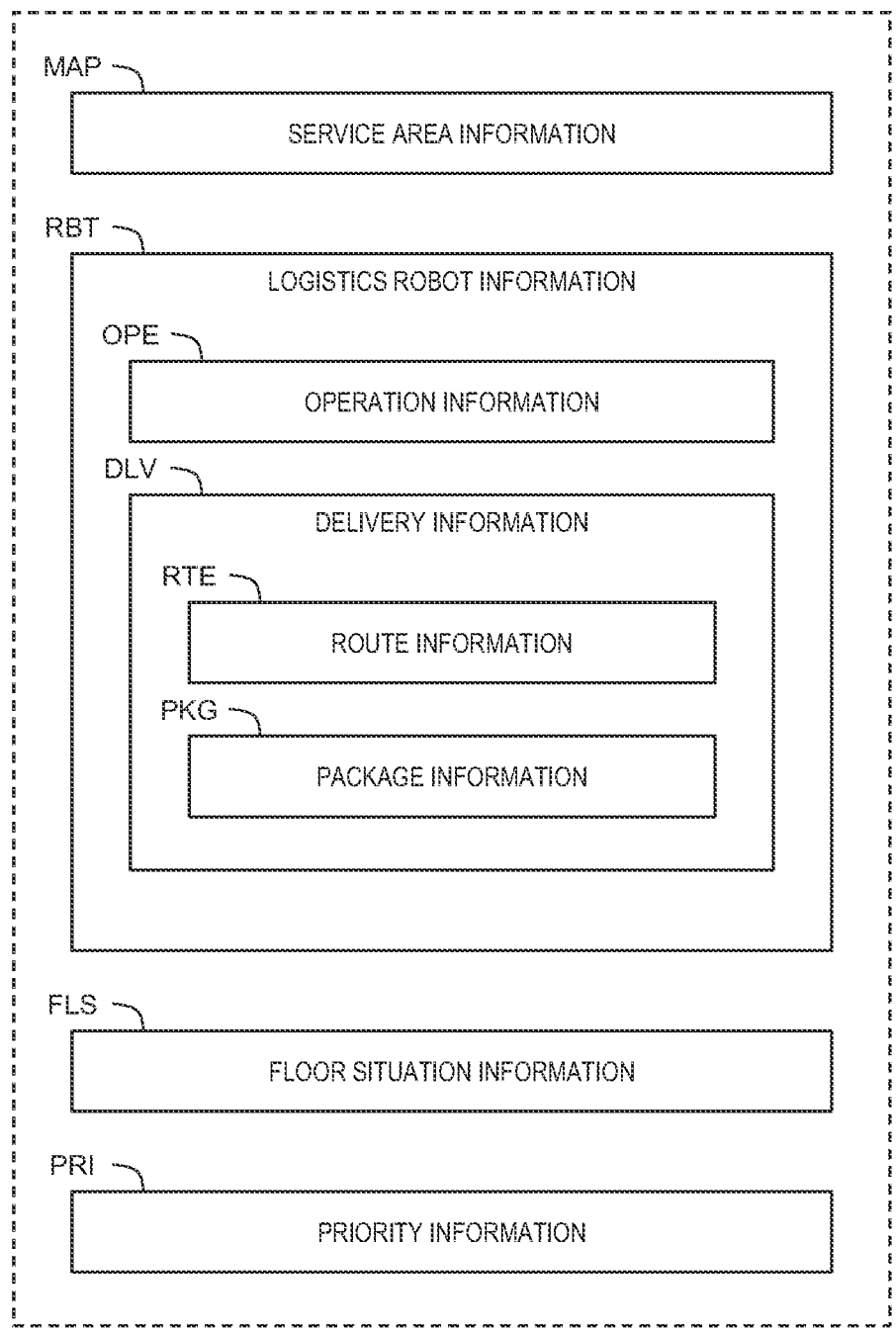
FIG. 11 is a block diagram showing an example of a variety of information in a management system according to an embodiment of the present disclosure.

FIG. 11 is a block diagram showing an example of a variety of information in the management system 100. The variety of information is stored in the memory device 150 and the database 160.

The service area information MAP indicates the configuration of the service area 2 (see FIG. 1) in which the logistics service is provided. For example, the service area information MAP includes a three-dimensional road map, a building layout, a floor configuration in a building, a room layout of each floor, an elevator layout of a building, and the like. The service area information MAP is created in advance. The service area information MAP may be updated at regular intervals.

The logistics robot information RBT is information regarding the logistics robot 10 and is generated for each logistics robot 10. For example, the logistics robot information RBT includes the operation information OPE and the delivery information DLV.

The operation information OPE indicates the position and the state of the logistics robot 10. The processor 140 communicates with each logistics robot 10 via the communication device 120 and periodically acquires the operation information OPE from each logistics robot 10.

The delivery information DLV is information regarding the package delivery. For example, the delivery information DLV includes the route information RTE and the package information PKG. The route information RTE indicates the delivery route along which the logistics robot 10 travels. The package information PKG indicates the delivery destination of each package. As described above, the package information PKG may indicate a correspondence relationship between the delivery destination and the physical quantity (weight, volume) for each package.

The logistics robot information RBT may further include performance information indicating performance of the logistics robot 10. For example, the performance information includes a size, a package storage capacity, a maximum loading weight, a battery capacity, a maximum travel range, a maximum travel speed, and the like of the logistics robot 10. The performance information is generated in advance.

The floor situation information FLS indicates the situation of the passage of each floor of the building 3. The floor situation information FLS is acquired by the sensor 5 installed on each floor of the building 3 (see FIGS. 5 and 6). The processor 140 communicates with each sensor 5 via the communication device 120 and acquires the floor situation information FLS from each sensor 5.

The priority information PRI indicates the priority among the plurality of floors when the packages are delivered to the plurality of floors of the building 3.

4-3. Delivery Process

The processor 140 receives a delivery request from a user of the logistics service. More specifically, the processor 140 receives the delivery request from the user terminal via the communication device 120. The delivery request includes a requested delivery position, a requested delivery date, a requested delivery time, and the like.

In response to the delivery request, the processor 140 assigns a logistics robot 10 that performs the requested delivery. More specifically, based on the service area information MAP, the operation information OPE, and the performance information, the processor 140 selects a logistics robot 10 that is able to arrive at the requested delivery position by the requested delivery time of the requested delivery date. Furthermore, based on the service area information MAP and the requested delivery position (i.e., the delivery destination), the processor 140 determines an appropriate delivery route and generates the route information RTE. In addition, the processor 140 generates the package information PKG regarding the package to be delivered.

As described above, in response to the delivery request from the user, the processor 140 assigns the logistics robot 10 that performs the delivery and generates the delivery information DLV regarding the logistics robot 10. The processor 140 communicates with the logistics robot 10 via the communication device 120, provides the delivery information DLV to the logistics robot 10, and instructs the logistics robot 10 to perform the delivery process in accordance with the delivery information DLV. That is to say, the processor 140 controls the logistics robot 10 by providing the delivery information DLV to the logistics robot 10. The logistics robot 10 performs the autonomous travel control based on the delivery information DLV to deliver the package.

Processing when the delivery destinations of the packages are dispersedly located on the plurality of floors of the same building 3 is as follows.

For example, the logistics robot 10 requests the management system 100 to provide the priority information PRI. The processor 140 receives the request from the logistics robot 10 via the communication device 120. In response to the request, the processor 140 performs the priority determination process to generate the priority information PRI (FIG. 4, Step S100). In the priority determination process, either the floor situation information FLS or the package information PKG is used as the reference information REF (see Section 2). The processor 140 communicates with the logistics robot 10 via the communication device 120 and provides priority information PRI to the logistics robot 10. The processor 140 instructs the logistics robot 10 to deliver the packages to the plurality of floors in accordance with the priority information PRI (FIG. 4, Step S200).

As another example, the logistics robot 10 requests the management system 100 to provide the floor situation information FLS. The processor 140 receives the request from the logistics robot 10 via the communication device 120. In response to the request, the processor 140 provides the floor situation information FLS to the logistics robot 10. The logistics robot 10 performs the priority determination process by using the floor situation information FLS as the reference information REF (FIG. 4, Step S100). Then, the logistics robot 10 performs the logistics robot control process based on the priority information PRI (FIG. 4, Step S200).

What is claimed is:

1. A logistics system providing a logistics service utilizing a logistics robot that delivers packages by autonomous traveling, the logistics system comprising one or more processors, configured to execute:
   a priority determination process that, when delivery destinations of the packages are dispersedly located on a plurality of floors of a building, determines priority among the plurality of floors by:
   acquiring floor situation information through a plurality of sensors located on each of the plurality of floors indicating a situation of a passage of each of the plurality of floors comprising information indicating whether a door facing the passage is open,
   identifying, based on the floor situation information, a number of specific targets existing on each of the plurality of floors, and
   setting the priority of each of the plurality of floors based on the number of specific targets existing on each of the plurality of floors, wherein the priority of a floor increases as the number of specific targets decreases, wherein the number of specific targets include a total number of children, disabled persons, and pets; and
   a logistics robot control process that controls the logistics robot so as to deliver the packages to the plurality of floors in an order of the priority,
   wherein in the priority determination process, the one or more processors are further configured to:
   calculate, based on the floor situation information, a predicted congestion degree of the passage of each of the plurality of floors, wherein
   the predicted congestion degree indicates a level of crowding of the passage by moving bodies present in the passage of each of the plurality of floors, and
   increase or decrease the predicted congestion degree for each of the plurality of floors based on the door being open; and
   set the priority of a floor with a lower predicted congestion degree to be higher than the priority of another floor with a higher predicted congestion degree.

2. The logistics system according to claim 1, wherein in the priority determination process, the one or more processors are configured to:
   acquire package information indicating at least one of a weight and a volume of each of the packages; and
   determine the priority based on the package information.

3. The logistics system according to claim 2, wherein in the priority determination process, the one or more processors are further configured to:
   calculate, based on the package information, a total weight of one or more packages to be delivered to each of the plurality of floors; and
   set the priority of a floor with a heavier total weight to be higher than the priority of another floor with a lighter total weight.

4. The logistics system according to claim 2, wherein in the priority determination process, the one or more processors are further configured to:
   calculate, based on the package information, a total volume of one or more packages to be delivered to each of the plurality of floors; and
   set the priority of a floor with a larger total volume to be higher than the priority of another floor with a smaller total volume.

5. The logistics system according to claim 1, wherein the sensors include cameras, and wherein in the priority determination process, the one or more processors are further configured to identify the specific target by analyzing image information acquired by the cameras.

6. The logistics system according to claim 1, wherein the moving bodies present in the passage comprise a total number of persons and logistics robots in the passage.

7. A logistics robot that delivers packages by autonomous traveling, the logistics robot comprising one or more processors configured to execute:
   a priority determination process that, when delivery destinations of the packages are dispersedly located on a plurality of floors of a building, determines priority among the plurality of floors by:
  acquiring floor situation information through a plurality of sensors located on each of the plurality of floors indicating situation of a passage of each of the plurality of floors comprising information indicating whether a door facing the passage is open, and,
  identifying, based on the floor situation information, a number of specific targets existing on each of the plurality of floors, and
  setting the priority of each of the plurality of floors based on the number of specific targets existing on each of the plurality of floorss, wherein the priority of a floor increases as the number of specific target decreases, wherein the number of specific targets includes a total number of children, disabled persons, and pets; and
a logistics robot control process that controls the logistics robot so as to deliver the to the plurality of floors in an order of the priority,
wherein in the priority determination process, the one or more processors are further configured to:
calculate, based on the floor situation information, a predicted congestion degree of the passage of each of the plurality of floors, wherein
  the predicted congestion degree indicates a level of crowding of the passage by moving bodies present in the passage of each of the plurality of floors, and
increase or decrease the predicted congestion degree for each of the plurality of floors based on the door being open; and
set the priority of a floor with a lower predicted congestion degree to be higher than the priority of another floor with a higher predicted congestion degree.

8. A logistics robot control method for controlling a logistics robot that delivers packages by autonomous traveling, the logistics robot control method comprising:

a priority determination process that, when delivery destinations of the packages are dispersedly located on a plurality of floors of a building, determines priority among the plurality of floors by:
  acquiring floor situation information through a plurality of sensors located on each of the plurality of floors indicating a situation of a passage of each of the plurality of floors comprising information indicating whether a door facing the passage is open,
  identifying, based on the floor situation information, a number of specific targets esxisting on each of the plurality of floors, and
  setting the priority of each of the plurality of floors based on the number of specific targets existing on each of the plurality of floors, wherein the priority of a floor increases as the number of specific targets decreases, wherein the number of specific targets includes a total number of children, disabled persons, and pets; and
a logistics robot control process that controls the logistics robot so as to deliver the packages to each of the plurality of floors in an order of the priority,
wherein the setting the priority of each of the plurality of floors comprises:
  calculating, based on the floor situation information, a predicted congestion degree of the passage of each of the plurality of floors, wherein
    the predicted congestion degree indicates a level of crowding of the passage by moving bodies present in the passage of each of the plurality of floors, and
  increase or decrease the predicted congestion degree for each of the plurality of floors based on the door being open; and
  setting the priority of a floor with a lower predicted congestion degree to be higher than the priority of another floor with a higher predicted congestion degree.

* * * * *